(12) United States Patent
Reed et al.

(10) Patent No.: US 10,798,549 B1
(45) Date of Patent: Oct. 6, 2020

(54) GALLEY INSERT WIRELESS COMMUNICATION SYSTEM

(71) Applicant: B/E Aerospace, Inc., Winston-Salem, NC (US)

(72) Inventors: Fred M. Reed, Brea, CA (US); Mudar S. Abu-Saymeh, Olathe, KS (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 16/372,063

(22) Filed: Apr. 1, 2019

(51) Int. Cl.
*H04W 4/80* (2018.01)
*B64D 11/00* (2006.01)
*H04W 76/14* (2018.01)
*H04W 84/12* (2009.01)

(52) U.S. Cl.
CPC ........... *H04W 4/80* (2018.02); *B64D 11/0015* (2013.01); *H04W 76/14* (2018.02); *H04W 84/12* (2013.01)

(58) Field of Classification Search
CPC ....................................................... H04W 4/42
See application file for complete search history.

(56) References Cited

U.S. PATENT DOCUMENTS

| 8,880,685 | B2 | 11/2014 | Birkmann et al. |
| 9,422,057 | B2 | 8/2016 | Koschberg et al. |
| 9,994,319 | B2 | 6/2018 | Godecker et al. |
| 2005/0121978 | A1* | 6/2005 | McAvoy .................. H02J 3/14 307/43 |
| 2009/0112377 | A1* | 4/2009 | Schalla .............. B64D 11/0015 701/3 |
| 2011/0148664 | A1* | 6/2011 | Shiomori ........... B64D 11/0015 340/945 |
| 2013/0248652 | A1* | 9/2013 | Godecker ........ B64D 11/00153 244/118.5 |

(Continued)

FOREIGN PATENT DOCUMENTS

| EP | 3208194 A1 | 8/2017 |
| WO | 2011119981 A1 | 9/2011 |
| WO | 2018140659 A1 | 8/2018 |

OTHER PUBLICATIONS

Extended Search Report dated Jun. 29, 2020 for EP Application No. 19212682.

*Primary Examiner* — Wen W Huang
(74) *Attorney, Agent, or Firm* — Suiter Swantz pc llo (57) ABSTRACT

A system for wirelessly communicating with aircraft galley inserts is disclosed. In one or more embodiments, a galley insert includes a communication interface configured to establish connectivity with an on-board WiFi router. The galley insert may further include a controller communicatively coupled to the communication interface. The controller may be configured to communicate with at least one device (e.g., a portable electronic device, another galley insert, etc.) in the aircraft cabin via the on-board WiFi router. In some embodiments, the communication interface may additionally or alternatively be configured to establish connectivity with at least one device in the aircraft cabin via at least one short-range wireless communication protocol (e.g., Bluetooth, Near Field Communication (NFC), or the like). In this regard, the controller may additionally or alternatively be configured to communicate with at least one device via the short-range wireless communication protocol.

14 Claims, 3 Drawing Sheets

(56) References Cited

U.S. PATENT DOCUMENTS

| | | | |
|---|---|---|---|
| 2015/0070492 A1* | 3/2015 | Hozumi | B64D 11/0007 348/143 |
| 2015/0126177 A1* | 5/2015 | Bauer | H04L 67/125 455/420 |
| 2017/0236195 A1* | 8/2017 | Verweij | B64D 11/0007 705/27.1 |
| 2017/0240295 A1* | 8/2017 | Ferrer | B64D 11/04 |
| 2018/0222588 A1 | 8/2018 | Bajorat et al. | |
| 2018/0308037 A1* | 10/2018 | Cloyd | G06Q 10/063114 |
| 2019/0210730 A1* | 7/2019 | Riedel | B64D 11/04 |
| 2019/0289336 A1* | 9/2019 | Finkhelstein | H04N 21/2146 |

* cited by examiner

GALLEY INSERT WIRELESS COMMUNICATION SYSTEM

BACKGROUND

Current aircraft, including commercial aircraft, are typically configured with a galley for food and beverage preparation. A galley of an aircraft may include multiple galley inserts, including beverage brewing machines (e.g., coffee makers), ovens, bun warmers, water heaters, refrigerators, freezers, wine chillers, air chillers, beverage carts, trash compactors, or the like. In order to ensure proper galley insert operation for optimal passenger experience, it may be desirable for a flight attendant (FA) to interact with a galley insert for many reasons including monitoring status of a catering process (brewing, heating, etc.), diagnosing fault conditions, changing catering settings (heating time, temperature settings, etc.), or the like. Some of these functions are currently accessed via a respective human machine interface (HMI) of the galley insert itself, but the HMI is limited in size and functionality, so there is a need for a greater amount of data and visibility into and control of the operation of the galley insert.

SUMMARY

A system for wirelessly communicating with aircraft galley inserts is disclosed. In one or more embodiments, the system includes an on-board WiFi router in an aircraft cabin and one or more galley inserts in the aircraft cabin. The one or more galley inserts may be communicatively coupled to the on-board WiFi router. For example, a galley insert of the one or more galley inserts may include a communication interface configured to establish connectivity with the on-board WiFi router. The galley insert may further include a controller communicatively coupled to the communication interface. The controller may be configured to communicate with at least one device (e.g., a portable electronic device, another galley insert, etc.) in the aircraft cabin via the on-board WiFi router.

In some embodiments, the communication interface may additionally or alternatively be configured to establish connectivity with at least one device (e.g., a portable electronic device, another galley insert, etc.) in the aircraft cabin via at least one short-range wireless communication protocol (e.g., Bluetooth, Near Field Communication, or the like). In this regard, the controller may additionally or alternatively be configured to communicate with at least one device via the short-range wireless communication protocol.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Current aircraft, including commercial aircraft, are typically configured with a galley for food and beverage preparation. A galley of an aircraft may include multiple galley inserts, including beverage brewing machines (e.g., coffee makers), ovens, bun warmers, water heaters, refrigerators, freezers, wine chillers, air chillers, beverage carts, trash compactors, or the like. In order to ensure proper galley insert operation for optimal passenger experience, it may be desirable for a flight attendant (FA) to interact with a galley insert for many reasons including monitoring status of a catering process (brewing, heating, etc.), diagnosing fault conditions, changing catering settings (heating time, temperature settings, etc.), or the like. Some of these functions are currently accessed via a respective human machine interface (HMI) of the galley insert itself, but the HMI is limited in size and functionality, so there is a need for a greater amount of data and visibility into and control of the operation of the galley insert. In general, wired bus communication and HMIs (e.g., device-mounted displays) do not allow for a rich interactive environment with the flight attendant. Furthermore, most galley inserts, particularly during flight, do not communicate via either wire or wireless.

Accordingly, embodiments of the present disclosure are directed at curing one or more of the shortfalls of previous approaches identified above. Broadly, embodiments of the present disclosure are directed to systems for wirelessly communicating with aircraft galley inserts. For example, some embodiments of the present disclosure are directed to a galley insert with a communication interface configured to wirelessly couple the galley insert to an on-board WiFi router that establishes communication between the galley insert and at least one device (e.g., a portable electronic device, another galley insert, etc.) in the aircraft cabin. In some embodiments, the communication interface may additionally or alternatively be configured to establish connectivity with at least one device (e.g., a portable electronic device, another galley insert, etc.) in the aircraft cabin via at least one short-range wireless communication protocol (e.g., Bluetooth, Near Field Communication (NFC), or the like). Communication between the galley insert and another device (e.g., portable electronic device) may allow for a much greater amount of data and visibility into and control of the operation of the galley insert.

Figure 1:
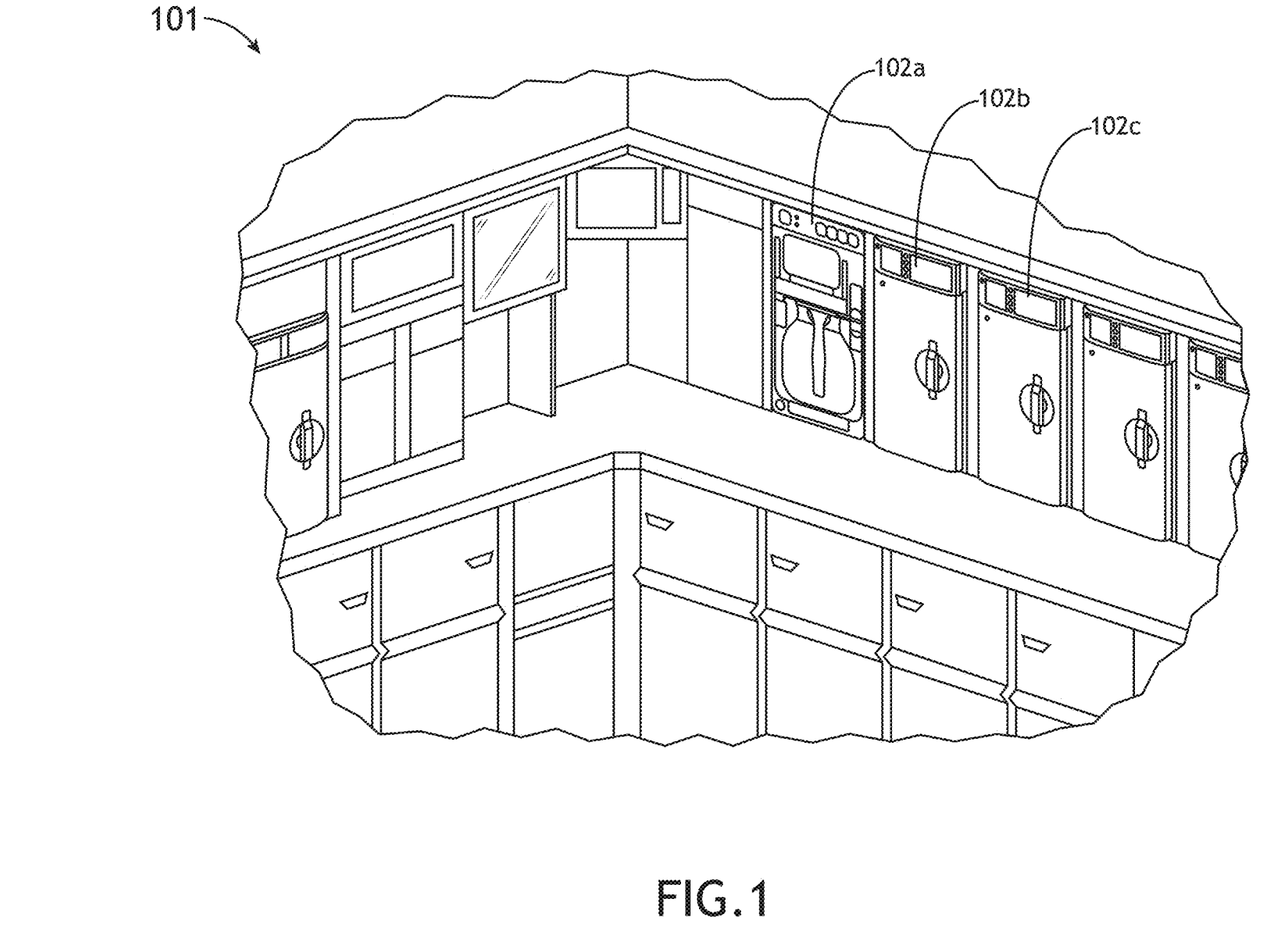
FIG. 1 is a schematic illustration of an aircraft environment including a galley of an aircraft cabin, in accordance with one or more embodiments of the present disclosure.

FIG. 1 illustrates an aircraft environment including a galley of an aircraft cabin 101, in accordance with an example embodiment of the present disclosure. As shown in FIG. 1, an aircraft cabin 101 may include an aircraft galley with one or more galley inserts 102. The one or more galley inserts 102a, 102b, 102c may include any galley insert known in the art including, but not limited to, beverage brewing machines (e.g., coffee maker galley insert 102a), ovens (e.g., oven galley insert 102b), chillers (e.g., chiller galley insert 102c), bun warmers, water heaters, refrigerators, freezers, wine chillers, air chillers, beverage carts, trash compactors, or the like.

Figure 2:
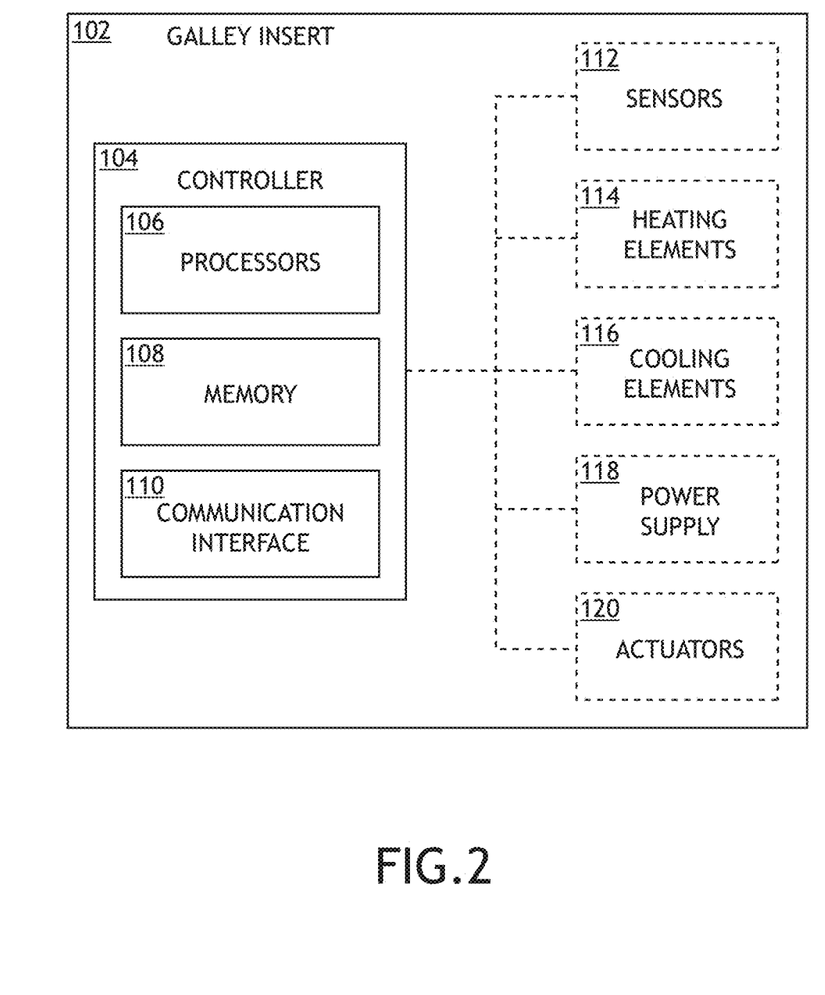
FIG. 2 is a block diagram illustrating a galley insert, in accordance with one or more embodiments of the present disclosure.

FIG. 2 illustrates a galley insert 102, in accordance with one or more embodiments of the present disclosure. As noted previously herein, galley insert 102 may include any galley insert known in the art including, but not limited to, a beverage brewing machine (e.g., coffee maker galley insert 102a), an oven (e.g., oven galley insert 102b), a chiller (e.g., chiller galley insert 102c), bun warmers, water heaters, refrigerators, freezers, wine chillers, air chillers, beverage carts, trash compactors, or the like. The galley insert 102 may include, but is not limited to, a controller 104 including one or more processors 106, a memory 108, and a communication interface 110. The galley insert 102 may further include one or more sensors 112, one or more heating elements 114, one or more cooling elements 116, a power supply 118, and one or more actuators 120.

In embodiments, the galley insert 102 includes a controller 104. The controller 104 may include, but is not limited to, one or more processors 106, a memory 108, and a communication interface 110. The one or more processors 106 provide processing functionality for the galley insert 102 and can include any number of processors, microcontrollers, circuitry, field programmable gate array (FPGA) or other processing systems, and resident or external memory for storing data, executable code, and other information accessed or generated by the galley insert 102. The or more processors 106 may be configured to execute one or more software programs or program instructions embodied in a non-transitory computer readable medium (e.g., memory 108) that implement techniques described herein. The controller 104 and/or or more processors 106 are not limited by the materials from which it is formed or the processing mechanisms employed therein and, as such, can be implemented via semiconductor(s) and/or transistors (e.g., using electronic integrated circuit (IC) components), or the like.

The memory 108 can be an example of tangible, computer-readable storage medium that provides storage functionality to store various data and/or program code associated with operation of the galley insert 102, such as software programs and/or code segments, or other data to instruct the or more processors 106 and/or other components of the galley insert 102 (e.g., one or more sensors 112, one or more heating elements 114, one or more cooling elements 116, a power supply 118, and one or more actuators 120, or the like) to perform the functionality described herein. Thus, the memory 108 can store data, such as a program of instructions for operating galley insert 102, including its components (e.g., controller 104, one or more processors 106, a memory 108, and a communication interface 110. The galley insert 102 may further include one or more sensors 112, one or more heating elements 114, one or more cooling elements 116, a power supply 118, and one or more actuators 120, etc.). It should be noted that while a single memory 108 is described, a wide variety of types and combinations of memory (e.g., tangible, non-transitory memory) can be employed. The memory 108 can be integral with the controller 104 and/or one or more processors 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, or the like.

The communication interface 110 can be operatively configured to communicate with components of the galley insert 102. For example, the communication interface 110 can be configured to retrieve data from the controller 104, one or more processors 106, memory 108, or other components of the galley insert 102 (e.g., one or more sensors 112, one or more heating elements 114, one or more cooling elements 116, a power supply 118, one or more actuators 120, or the like). In embodiments, the communication interface 110 is configured to transmit data for storage in the memory 108, retrieve data from storage in the memory 108, and so forth. The communication interface 110 can also be communicatively coupled with the controller 104 to facilitate data transfer between components of the galley insert 102. It should be noted that while the communication interface 110 is described as a component of the galley insert 102 and controller 104, one or more components of the communication interface 110 can be implemented as external components communicatively coupled to the galley insert 102 and/or controller 104 via a wired and/or wireless connection.

In embodiments, the communication interface 110 includes or is coupled to a transmitter, receiver, transceiver, physical connection interface, or any combination thereof. It is contemplated herein that the communication interface 110 may be configured to communicatively couple to various other components of system 100 in any manner known in the art. For example, the communication interface 110 may be configured to transmit and/or receive data using any wired or wireless communication protocol/technique known in the art including, but not limited to, copper wire, fiber optic cable, RF coupling, IR coupling, Wireless Personal Area Network (WPAN) protocols/Wireless Local Area Network (WLAN) protocols (e.g., WiFi, WiMax, Bluetooth, ZigBee, X-Bee, Z-Wave, M-Bus, or the like), medium range Wireless Neighborhood Area Network (WNAN) protocols (e.g., Wi-SUN, WM-Bus, or the like), or long-range wireless protocols (e.g., 3G, 4G, 4G LTE, 5G, or the like).

Figure 3:
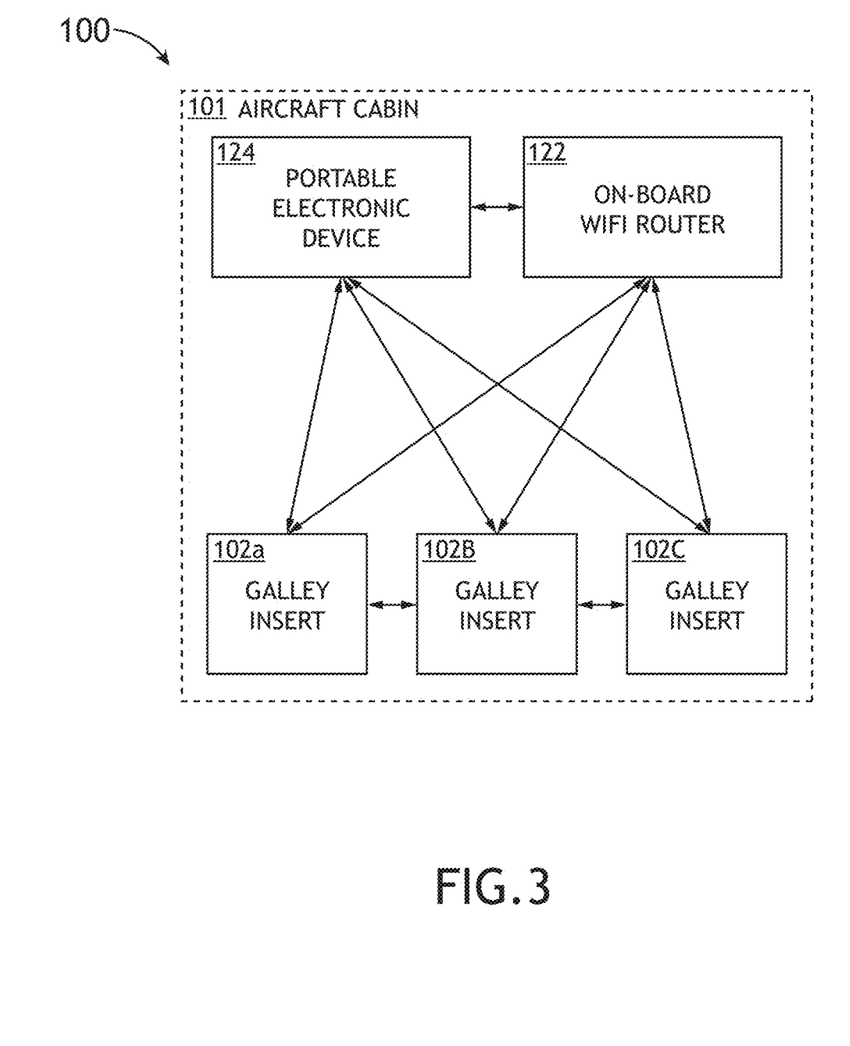
FIG. 3 is a block diagram illustrating a system for wirelessly communicating with aircraft galley inserts, in accordance with one or more embodiments of the present disclosure.

In some embodiments, the communication interface 110 includes a WiFi transceiver configured to establish connectivity between the galley insert 102 and an on-board WiFi router (e.g., the on-board WiFi router 122 shown in FIG. 3, or the like). The communication interface 110 may additionally or alternatively include a wireless transceiver for short-range wireless communication (e.g., Bluetooth, Near Field Communication (NFC), or the like). For example, the communication interface 110 may include a Bluetooth transceiver, NFC transceiver, or the like. In some embodiments, the communication interface 110 is configured to establish connectivity between the galley insert 102 and another device (e.g., the portable electronic device 124 shown in FIG. 3, another galley insert 102, or the like) via at least one short-range wireless communication protocol.

In some embodiments, the galley insert 102 may include various components communicatively coupled to the controller 104. In a general sense, the various components of the galley insert 102 communicatively coupled to the controller 104 may include any component configured to carry out one or more of the functions of the respective galley insert 102. For example, as shown in FIG. 2, the galley insert 102 may include, but is not limited to, one or more sensors 112, one or more heating elements 114, one or more cooling elements 116, a power supply 118, and one or more actuators 120. The one or more sensors 112 may include any sensor known in the art including, but not limited to, temperature sensors, pressure sensors, humidity sensors, flow rate sensors, level sensors, or the like. In embodiments, the one or more sensors 112 are configured to generate, collect, and transmit data to the controller 104. For example, a temperature sensor of the one or more sensors 112 may be configured to collect temperature readings on a regular, semi-regular, or irregular basis, and transmit the collected temperature readings to the controller 104. The one or more processors 106 of the controller 104 may then be configured to receive the data/sensor readings from the one or more sensors 112 and store the received data in memory 108.

Similarly, the one or more heating elements 114 and the one or more cooling elements 116 may include any heating/cooling elements or systems known in the art including, but not limited to, resistive heaters, radiant heaters, compressors, evaporators, heat sinks, or the like. In embodiments, one or more heating elements 114 and the one or more cooling elements 116 are configured to generate, collect, and transmit data to the controller 104 regarding operational data of the one or more heating elements 114 and the one or more cooling elements 116. The one or more processors 106 of the controller 104 may then be configured to receive the data/readings from the one or more heating elements 114 and the one or more cooling elements 116 and store the received data in memory 108.

The power supply 118 may include any power supply module or power supply system known in the art. In this regard, the power supply 118 may include or may be configured to receive electrical power from a power source (e.g., electrical outlet, battery, or the like). The power supply 118 may be configured to distribute electrical power from a power supply to other components of the galley insert 102 (e.g., controller 104, memory 108, communication interface 110, one or more sensors 112, one or more heating elements 114, one or more cooling elements 116, a power supply 118, one or more actuators 120, any combination thereof, or the like).

In embodiments, the power supply 118 is configured to generate, collect, and transmit data to the controller 104 regarding operational data of the power supply 118. For example, operational data generated, collected, and transmitted by the power supply 118 may include, but is not limited to, galley insert 102 power consumption, power supply 118 power level (e.g., battery level), or the like. The one or more processors 106 of the controller 104 may then be configured to receive the data/readings from the power supply 118 and store the received data in memory 108.

The one or more actuators 120 communicatively coupled to the controller 104 may include any actuators known in the art configured to carry out one or more of the functions of the galley insert 102. For example, the one or more actuators may include a pump, a compressor, a mechanical arm, or the like. In embodiments, the one or more actuators 120 are configured to generate, collect, and transmit data to the controller 104 regarding operational data of the one or more actuators 120. The one or more processors 106 of the controller 104 may then be configured to receive the data/readings from the one or more actuators 120 and store the received data in memory 108.

FIG. 3 illustrates a system 100 for wirelessly communicating with aircraft galley inserts 102, in accordance with one or more embodiments of the present disclosure. The system 100 may include, but is not limited to, one or more galley inserts 102a, 102b, 102c, an aircraft on-board WiFi router 122, and one or more portable electronic devices 124.

The system 100 depicted in FIG. 3 may be configured to collect, store, and generate data associated with the one or more galley inserts 102 and transmit the collected data, via the on-board WiFi router 122, to one or more portable electronic devices 124, other galley inserts 102, or the like. It is contemplated herein that the ability to transmit galley insert 102 data to one or more portable electronic devices 124 may provide for in-flight galley insert data monitoring and/or fault detection. Furthermore, by enabling the transmission of data to and/or from the galley inserts 102, system 100 may facilitate timely, efficient, and cost-effective maintenance, updating, and repair of the one or more galley inserts 102.

In embodiments, one or more galley inserts 102a, 102b, 102c within an aircraft cabin 101 may be communicatively coupled to an on-board WiFi router 122. In this regard, the controller 104 of a galley insert 102 may be configured to communicatively couple, via the communication interface 110, to the on-board WiFi router 122 utilizing WiFi communication protocols, as described previously herein. In embodiments, the on-board WiFi router 122 may include an on-board WiFi router 122 which provides WiFi connectivity to passengers aboard the aircraft (e.g., passengers within aircraft cabin 101).

The one or more galley inserts 102a, 102b, 102c may be configured to transmit data stored in memory 108 via the communication interface 110. For example, as shown in FIG. 3, the one or more galley inserts 102a-102c may be configured to transmit data stored in memory to one or more additional galley inserts 102a-102c, the on-board WiFi router 122, and/or the one or more portable electronic devices 124. The one or more galley inserts 102 may be configured to communicatively couple with various other components of system 100 (e.g., another galley insert 102, on-board WiFi router 122, portable electronic device 124) via any short-range wireless communication protocol known in the art. For example, in embodiments, a galley insert 102 may communicatively couple to the on-board WiFi router 122 via WiFi communication protocols, and may communicatively couple with other galley inserts 102 and/or one or more portable electronic devices 124 via Bluetooth communication protocols, NFC communication protocols, or the like.

The one or more galley inserts 102a, 102b, 102c may be configured to transmit data to the on-board WiFi router 122 at any regular, semi-regular, or irregular interval known in the art. For example, in embodiments, the galley insert 102a may be configured to transmit data stored in memory 108 to another device of system 100 (e.g., another galley insert 102, on-board WiFi router 122, portable electronic device 124) every ten minutes. For example, in embodiments, the galley insert 102a may be configured to transmit data stored in memory 108 to the on-board WiFi router 122 only when data collected and stored in a memory 108 of a galley insert 102 indicates a galley insert 102 is malfunctioning or deteriorating in performance. Accordingly, it is contemplated herein that the galley inserts 102 may be configured to transmit data at regular intervals and/or specified times in order to provide regular status updates, malfunctioning alerts, maintenance alerts, maintenance reminders, or the like.

The data stored and transmitted by the one or more galley inserts 102 may include data collected by the one or more sensors 112, data collected by the heating elements 114 and cooling elements 116, data associated with the power supply 118, data associated with the one or more actuators 120, or the like. In this regard, the data transmitted by the one or more galley inserts 102 may include any data associated with the one or more galley inserts 102 including, but not limited to, galley insert 102 status, performance, usage, health, or the like.

In embodiments, the on-board WiFi router 122 is configured to receive data from the one or more galley inserts 102 and transmit the received data to other components of system 100. For example, the on-board WiFi router 122 may be configured to receive data from a first galley insert 102a, and transmit the received data to a second galley insert 102b. In this regard, system 100 may be used to share data and information between various galley inserts 102 of system 100. In another example, the on-board WiFi router 122 may be configured to receive data from a first galley insert 102a, and transmit the received data to one or more portable electronic devices 124.

The one or more portable electronic devices 124 may include any portable electronic device known in the art including, but not limited to, a smart phone, a smart watch, pendant, or other wearable smart device, a tablet, a personal digital assistant (PDA), a laptop, or the like. For example, a portable electronic device 124 may include a tablet controlled and operated by a flight attendant of the aircraft cabin 101. In this regard, the one or more portable electronic devices 124 may be configured to receive data directly from the one or more galley inserts 102 and/or indirectly via the on-board WiFi router 122. It is contemplated herein that data received from the one or more galley inserts 102 may be shown and displayed to a user (e.g., flight attendant) via a display/user interface of the portable electronic device 124. As compared to currently available HMI's of galley inserts 102, a portable electronic device 124 may provide a larger, more efficient, and more streamlined user interface with which a user may view galley insert 102 data, and interact with the galley inserts 102a-102c.

In embodiments, the controller 104 of a galley insert 102 may be configured to receive one or more control commands via one or more control signals transmitted from a portable electronic device 124. The one or more input commands may be transmitted directly from the portable electronic device 124 and/or indirectly via the on-board WiFi router 122 or another galley insert 102. For example, a user (e.g., a flight attendant) may input one or more input commands into a user interface of the portable electronic device 124. The portable electronic device 124 may then be configured to transmit one or more control commands to one or more galley inserts 102 (either directly or indirectly). The one or more control commands may be configured to adjust one or more characteristics of the one or more galley inserts 102. It is contemplated herein that the one or more control commands may be configured to adjust any characteristic of the one or more galley inserts 102 including, but not limited to, heating times, temperature settings, brewing settings, or the like. Furthermore, system 100 may be used to update and/or adjust one or more operating parameters or characteristics of the one or more galley inserts 102 wirelessly while the aircraft is on the ground or in flight. Adjusting one or more characteristics of the galley inserts 102 may include, but is not limited to, storing programmable cooking profiles in memory 108, adjusting one or more characteristics of the one or more sensors 112, adjusting one or more characteristics of the one or more heating elements 114 or cooling elements 116, adjusting one or more characteristics of the power supply 118, adjusting one or more characteristics of the one or more actuators 120, or the like. In this regard, a user (e.g., flight attendant) may be able to view and adjust operational data and characteristics of the one or more galley inserts 102 within the aircraft cabin 101 from a portable electronic device 124 (e.g., smart phone, smart watch, tablet, laptop, or the like).

In some embodiments, a passenger may be able to place orders or otherwise control one or more galley inserts 102 via a portable electronic device 124 (e.g., smart phone, smart watch, tablet, laptop, or the like). For example, a passenger may be able to order and/or control preparation of beverages, heated items, or chilled items from a galley insert 102 (e.g., beverage maker/brewer, oven/microwave, refrigerator/chiller, and/or vending machine) via the portable electronic device 124. In this regard, the portable electronic device 124 may be configured to transmit passenger-input orders or instructions to the galley insert 102 (e.g., via WiFi and/or short-range wireless communication). In some embodiments, the portable electronic device 124 may be further configured to collect payment (e.g., via mobile payment application, mobile credit card processing, or the like) for items ordered (e.g., vended items) and/or for use of the galley insert 102 (e.g., to warm foods).

It is noted herein that data communications regarding aircraft and aircraft component performance typically must adhere to stringent communication protocol guidelines and regulations set by multiple agencies/organizations (e.g., Federal Aviation Administration). Adherence to strict communication protocols are used to ensure efficient data transmission, and to prevent interference with communications to and from surrounding aircraft. However, adherence to these stringent communication protocols may not be required, or even desirable, in the context of non-safety-critical transmissions, such as transmissions regarding aircraft galley inserts 102. In this regard, it is contemplated herein that data generated by galley inserts 102 may be collected and transmitted to various other components of system 100 (e.g., other galley inserts 102, on-board WiFi router 122, portable electronic devices 124) without adhering to the stringent communication protocols required for most aircraft communications. For example, it is contemplated herein that the system 100 of the present disclosure may utilize communication techniques (e.g., WiFi communication protocols, Bluetooth communication protocols, NFC communication protocols, or the like) which prevent the need to adhere to strict communication protocol regulations/standards put forth by various governing bodies including, but not limited to, the Federal Aviation Administration (FAA), the European Aviation Safety Agency (EASA), additional/alternative flight certification organizations, the American National Standards Institute (ANSI), Aeronautical Radio, Incorporated (ARINC), the Radio Technical Commission for Aeronautics (RTCA), and/or additional/alternative aircraft guidelines organizations, or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for wirelessly communicating with aircraft galley inserts, comprising:
   an on-board WiFi router in an aircraft cabin;
   one or more galley inserts in the aircraft cabin communicatively coupled to the on-board WiFi router, a galley insert of the one or more galley inserts including:
      a communication interface configured to establish connectivity with the on-board WiFi router; and
      a controller communicatively coupled to the communication interface, the controller configured to:
      communicate with at least one device in the aircraft cabin other than the galley insert via the on-board WiFi router;
      collect data from one or more components of the galley insert; and
      transmit the collected data, via the communication interface, to the on-board WiFi router, wherein the on-board WiFi router is configured to receive the collected data from the galley insert and transmit the collected data to the at least one device, wherein the at least one device comprises a portable electronic device, and wherein the controller is configured to receive a passenger-input order or instruction from the portable electronic device via the on-board WiFi router and is further configured to control the galley insert based on the passenger-input order or instruction, the one or more components of the galley insert comprise at least one of a sensor, a heating element, a cooling element, a power supply, or an actuator, the passenger-input order or instruction from the portable electronic device is configured to control at least one of a heating element, cooling element, or an actuator of the one or more galley inserts.

2. The system of claim 1, wherein the controller is configured to receive, via the communication interface, one or more commands or data transmitted by the at least one device via the on-board WiFi router.

3. The system of claim 2, wherein the controller is further configured to adjust one or more characteristics of the at least one galley insert based on the one or more commands or data transmitted by the at least one device.

4. The system of claim 1, wherein the communication interface is further configured to establish connectivity between the galley insert and at least one of a portable electronic device or another galley insert via at least one short-range wireless communication protocol.

5. The system of claim 4, wherein the at least one short-range wireless communication protocol comprises a Bluetooth communication protocol.

6. The system of claim 4, wherein the at least one short-range wireless communication protocol comprises a Near Field Communication (NFC) protocol.

7. The system of claim 1, wherein the one or more galley inserts include at least one of a brewing machine, an oven, a chiller, or a bun warmer.

8. A system for wirelessly communicating with aircraft galley inserts, comprising:
   one or more galley inserts in an aircraft cabin, a galley insert of the one or more galley inserts including:
      a communication interface configured to establish connectivity with at least one device in the aircraft cabin other than the galley insert via at least one short-range wireless communication protocol; and
      a controller communicatively coupled to the communication interface, the controller configured to:
      communicate with the at least one device via the at least one short-range wireless communication protocol, wherein the at least one device comprises a portable electronic device;
      collect data from one or more components of the galley insert; and
   transmit the collected data, via the communication interface, to the on-board WiFi router, wherein the on-board WiFi router is configured to receive the collected data from the galley insert; and
      transmit the collected data to the at least one device, and wherein the controller is configured to receive a passenger-input order or instruction from the portable electronic device via the at least one short-range wireless communication protocol and is further configured to control the galley insert based on the passenger-input order or instruction, the one or more components of the galley insert comprise at least one of a sensor, a heating element, a cooling element, a power supply, or an actuator, the passenger-input order or instruction from the portable electronic device is configured to control at least one of a heating element, cooling element, or an actuator of the one or more galley inserts.

9. The system of claim 8, wherein the at least one short-range wireless communication protocol comprises a Bluetooth communication protocol.

10. The system of claim 8, wherein the at least one short-range wireless communication protocol comprises a Near Field Communication (NFC) protocol.

11. The system of claim 8, wherein the controller is configured to receive, via the communication interface, one or more commands or data transmitted by the at least one device via the at least one short-range wireless communication protocol.

12. The system of claim 11, wherein the controller is further configured to adjust one or more characteristics of the at least one galley insert based on the one or more commands or data transmitted by the at least one device.

13. The system of claim 8, further comprising an on-board WiFi router, wherein the communication interface is further configured to establish connectivity with the on-board WiFi router, and the controller is further configured to communicate with at least one of a portable electronic device or another galley insert via the on-board WiFi router.

14. The system of claim 8, wherein the one or more galley inserts include at least one of a brewing machine, an oven, a chiller, or a bun warmer.

* * * * *